(12) United States Patent
Takeno et al.

(10) Patent No.: US 12,490,898 B2
(45) Date of Patent: Dec. 9, 2025

(54) OPHTHALMIC SYSTEM

(71) Applicant: NIDEK CO., LTD., Gamagori (JP)

(72) Inventors: Naoki Takeno, Aichi (JP); Yasuhiro Furuuchi, Aichi (JP); Shinya Mito, Aichi (JP); Kouji Hamaguchi, Aichi (JP)

(73) Assignee: NIDEK CO., LTD., Aichi (JP)

( * ) Notice: Subject to any disclaimer, the term of this patent is extended or adjusted under 35 U.S.C. 154(b) by 482 days.

(21) Appl. No.: 18/192,078

(22) Filed: Mar. 29, 2023

(65) Prior Publication Data

US 2023/0233080 A1   Jul. 27, 2023

Related U.S. Application Data

(63) Continuation of application No. PCT/JP2021/033313, filed on Sep. 10, 2021.

(30) Foreign Application Priority Data

Sep. 30, 2020   (JP) .................................. 2020-164388
Aug. 3, 2021     (JP) .................................. 2021-127230

(51) Int. Cl.
*A61B 3/10*       (2006.01)
*A61B 3/00*       (2006.01)
(Continued)

(52) U.S. Cl.
CPC ............ *A61B 3/185* (2013.01); *A61B 3/0025* (2013.01); *A61B 3/0075* (2013.01)

(58) Field of Classification Search
CPC ... A61B 3/0025; A61B 3/0075; A61B 3/0083; A61B 3/152; A61B 3/185; A61B 34/00
See application file for complete search history.

(56) References Cited

U.S. PATENT DOCUMENTS

2010/0110171 A1   5/2010   Satake
2018/0360654 A1   12/2018  Michels et al.
(Continued)

FOREIGN PATENT DOCUMENTS

EP   3 138 473 A1    3/2017
JP   2010-110392 A   5/2010
(Continued)

OTHER PUBLICATIONS

International Search Report (PCT/ISA/210) dated Nov. 22, 2021, issued by the International Searching Authority in counterpart International Application No. PCT/JP2021/033313.
(Continued)

*Primary Examiner* — Jack Dinh
(74) *Attorney, Agent, or Firm* — Sughrue Mion, PLLC (57) ABSTRACT

An ophthalmic system for examining a subject eye of an examinee includes a plurality of examination units, a robot mechanism, and a controller. The plurality of examination units have housings different from each other, perform examinations different from each other, and include at least a first examination unit and a second examination unit. The robot mechanism has a holding unit that holds and releases either the first examination unit or the second examination unit, and a moving unit that is connected to the holding unit and moves three-dimensionally. A controller controls driving of the robot mechanism to adjust a relative positional relationship between the subject eye and the first examination unit or the second examination unit held by the holding unit. The first examination unit or the second examination unit is replaced to be held by the holding unit for performing a different examination on the subject eye.

9 Claims, 8 Drawing Sheets

(51) Int. Cl.
*A61B 3/18* (2006.01)
*G06T 7/00* (2017.01)
*G16H 30/40* (2018.01)

(56) References Cited

U.S. PATENT DOCUMENTS

2019/0279759 A1 9/2019 Kado
2021/0343399 A1 11/2021 Kado

FOREIGN PATENT DOCUMENTS

| JP | 2017-46939 A | 3/2017 |
| JP | 2018-68707 A | 5/2018 |
| JP | 2018-521753 A | 8/2018 |
| JP | 2019-154734 A | 9/2019 |
| JP | 2020-137915 A | 9/2020 |

OTHER PUBLICATIONS

Written Opinion (PCT/ISA/237) dated Nov. 22, 2021, issued by the International Searching Authority in counterpart International Application No. PCT/JP2021/033313.

OPHTHALMIC SYSTEM

CROSS-REFERENCE TO RELATED APPLICATION

This is a continuation application of International Application No. PCT/JP2021/033313 filed on Sep. 10, 2021 which claims priority from Japanese Patent Applications No. 2020-164388 filed on Sep. 30, 2020 and No. 2021-127230 filed on Aug. 3, 2021. The entire contents of the earlier applications are incorporated herein by reference.

TECHNICAL FIELD

The present disclosure relates to an ophthalmic system for examining a subject eye.

BACKGROUND

Various devices are used for examining a subject eye of an examinee according to purposes. For example, there are an optical coherence tomography that captures a tomographic image of the anterior segment or the fundus of the subject eye (JP2010-110392A), a scanning laser ophthalmoscope that scans two-dimensionally the fundus of the subject eye with a laser beam (JP2017-046939A), an ophthalmic device for objectively or subjectively measuring optical characteristics of the subject eye (JP2020-137915A), and the like.

In order to cope with various examinations of the subject eye, a plurality of devices as described above are often installed in an examination room, thereby requiring a larger space. The examinee has to go around a plurality of devices in order for examination, which is troublesome to move.

SUMMARY

A technical object of the present disclosure is to provide an ophthalmic system capable of efficiently examining a subject eye.

An ophthalmic system according to a first aspect of the present disclosure is an ophthalmic system for examining a subject eye of an examinee, including: a plurality of examination units having housings different from each other, performing examinations different from each other, and including at least a first examination unit and a second examination unit; a robot mechanism having a holding unit that holds and releases either the first examination unit or the second examination unit, and a moving unit that is connected to the holding unit and moves three-dimensionally; and controller configured to control driving of the robot mechanism to adjust a relative positional relationship between the subject eye and the first examination unit or the second examination unit held by the holding unit, in which the first examination unit or the second examination unit is replaced to be held by the holding unit for performing a different examination on the subject eye.

An ophthalmic system according to a second aspect of the present disclosure is an ophthalmic system for examining on a subject eye or performing surgery on the subject eye, including: a plurality of units having housings different from each other, performing examinations or surgeries different from each other, and including at least a first unit and a second unit; a robot mechanism having a holding unit that holds and releases either the first unit or the second unit, and a moving unit that is connected to the holding unit and moves three-dimensionally; and controller configured to control driving of the robot mechanism to adjust a relative positional relationship between the subject eye and the first unit or the second unit held by the holding unit, in which the first unit or the second unit is replaced to be held by the holding unit for performing a different examination or different surgery on the subject eye.

DETAILED DESCRIPTION

Overview

An ophthalmic system of the first aspect of the present embodiment may be an ophthalmic system for examining a subject eye of an examinee.

The ophthalmic system includes: a plurality of examination units having housings different from each other, performing examinations different from each other, and including at least a first examination unit and a second examination unit; a robot mechanism having a holding unit that holds and releases either the first examination unit or the second examination unit, and a moving unit that is connected to the holding unit and moves three-dimensionally; and a controller which controls driving of the robot mechanism to adjust a relative positional relationship between the subject eye and the first examination unit or the second examination unit held by the holding unit, in which the first examination unit or the second examination unit is replaced to be held by the holding unit for performing a different examination on the subject eye.

In the ophthalmic system, the controller may set alignment positions of the plurality of examination units with respect to the subject eye, the alignment positions corresponding to the first examination unit and the second examination unit, and control a movement of the moving unit to adjust a position of the first examination unit or the second examination unit to the set alignment position.

In the ophthalmic system, the robot mechanism may have a face detection unit that detects a face of the examinee, and the controller may control a movement of the moving unit based on the detection result of the face detection unit to adjust a position of the first examination unit or the second examination unit.

In the ophthalmic system, the controller may control the driving of the robot mechanism to cause the holding unit to hold or release either the first examination unit or the second examination unit, and the first examination unit or the second examination unit is replaced to be held by the holding unit for performing the different examination on the subject eye.

In the ophthalmic system, the controller may control a movement of the moving unit to bring the holding unit closer to a storage position of the first examination unit or the second examination unit, and to cause the holding unit to selectively hold either the first examination unit or the second examination unit.

In the ophthalmic system, the first examination unit and the second examination unit may have identifiers for identifying each other on the housing, the ophthalmic system may further include an identifier detection unit that detects the identifier, and the controller may select and replace the first examination unit or the second examination unit held by the holding unit, based on a detection result of the identifier detection unit.

In the ophthalmic system, the robot mechanism may have an arm, as the moving unit, which includes a plurality of joints, and the controller may control a movement of the arm via the plurality of joints to adjust a position of the first examination unit or the second examination unit.

In the ophthalmic system, the robot mechanism may include at least one rotation axis in the plurality of joints, and the controller may control a rotation of the rotation axis to adjust at least one angle of a roll angle, a pitch angle, and a yaw angle of the first examination unit or the second examination unit.

The ophthalmic system may include a vehicle accommodating the plurality of examination units having the housings different from each other, performing examinations different from each other, and including at least the first examination unit and the second examination unit, the robot mechanism having the holding unit that holds and releases either the first examination unit or the second examination unit, and the moving unit that is connected to the holding unit and moves three-dimensionally, and controller which controls the driving of the robot mechanism to adjust the relative positional relationship between the subject eye and the first examination unit or the second examination unit held by the holding unit.

An ophthalmic system of a second aspect of the present embodiment may be an ophthalmic system for examining on a subject eye or performing surgery on the subject eye.

The ophthalmic system may include a plurality of units having housings different from each other, performing examinations or surgeries different from each other, and including at least a first unit and a second unit; a robot mechanism having a holding unit that holds and releases either the first unit or the second unit, and a moving unit that is connected to the holding unit and moves three-dimensionally; and a controller which controls driving of the robot mechanism to adjust a relative positional relationship between the subject eye and the first unit or the second unit held by the holding unit, in which the first unit or the second unit is replaced to be held by the holding unit for performing a different examination or different surgery on the subject eye.

The ophthalmic system may include a vehicle accommodating the plurality of units having the housings different from each other, performing examinations or surgeries different from each other, and including at least the first unit and the second unit, the robot mechanism having the holding unit that holds and releases either the first unit or the second unit, and the moving unit that is connected to the holding unit and moves three-dimensionally, and a controller which controls the driving of the robot mechanism to adjust the relative positional relationship between the subject eye and the first unit or the second unit held by the holding unit.

EXAMPLE

An example of an ophthalmic system according to the present embodiment will be described.

Figure 1:
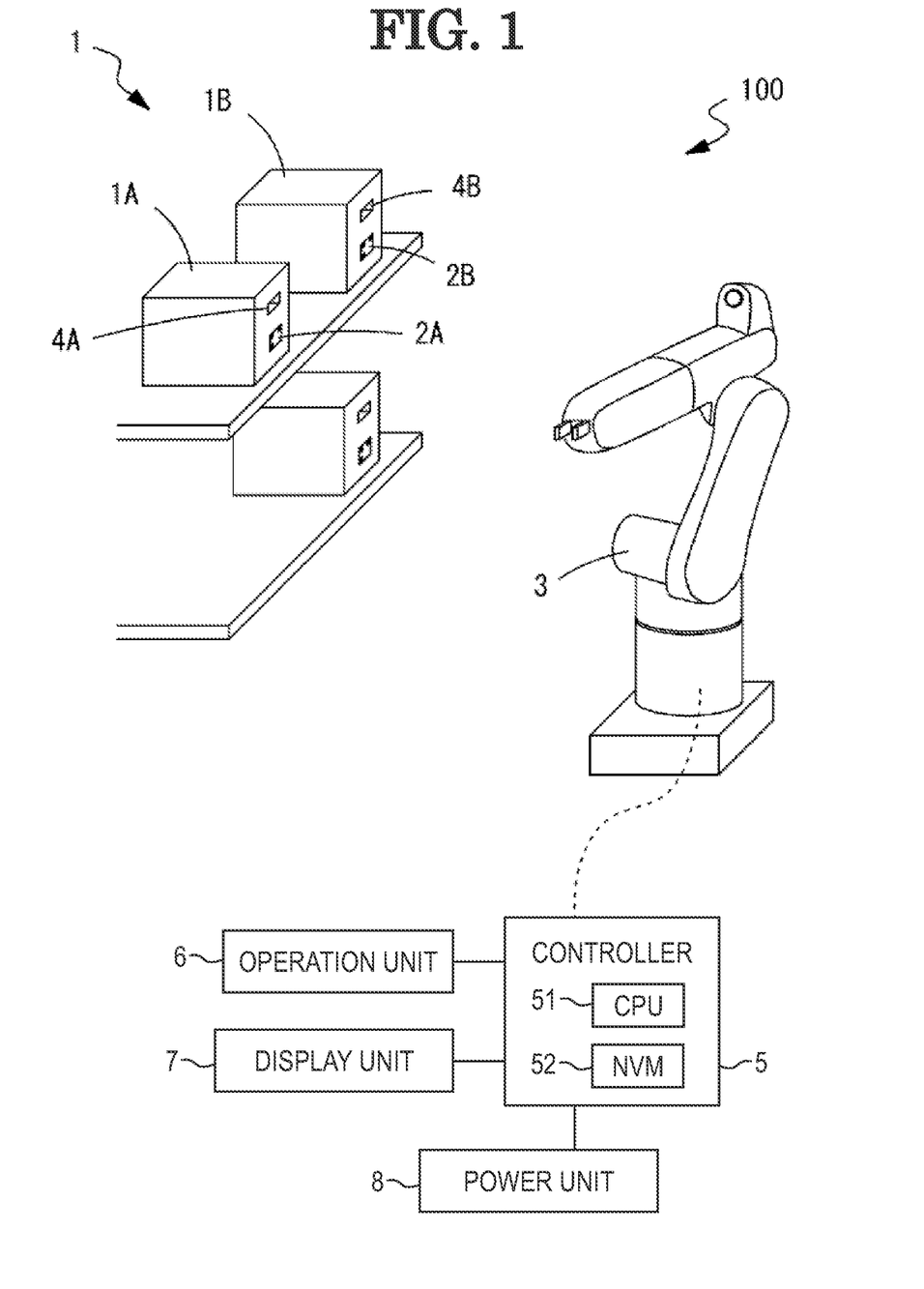
FIG. 1 is a diagram showing a configuration of an ophthalmic system.

FIG. 1 is a diagram showing a configuration of the ophthalmic system. An ophthalmic system 100 includes a plurality of examination units 1, a robot mechanism 3, and a controller 5.

Examination Unit

The plurality of examination units 1 have housings different from each other. The housing is disposed in a defined storage position on a predetermined shelf. Identifiers 2 are provided on a rear surface of the housing for mutually identifying the examination units. Further, a connection unit 4 is provided on the rear surface of the housing for holding each examination unit in a holding unit 37 which will be described later. In the present example, the plurality of examination units 1 include at least a first examination unit 1A and a second examination unit 1B. An identifier 2A and a connection unit 4A are provided on the housing of the first examination unit 1A, and an identifier 2B and a connection unit 4B are provided on the housing of the second examination unit 1B.

The plurality of examination units 1 (first examination unit 1A and second examination unit 1B) have examination optical systems different from each other. For example, at least one of various examination optical systems such as a fundus imaging optical system, a tomographic imaging optical system, an intraocular pressure measurement optical system, an eye axial length measurement optical system, an eye refractive power measurement optical system, a corneal curvature measurement optical system, and the like are provided. As an example, the first examination unit 1A may be an examination unit having an intraocular pressure measurement optical system, and the second examination unit 1B may be an examination unit having the tomographic imaging optical system. Different examinations can be performed by using the respective examination units.

The identifiers 2 (identifiers 2A and 2B) provided in each of the plurality of examination units 1 may be of any type as long as the information can be read using various machine-readable technologies. For example, the identifier 2 in the present example is a two-dimensional code. Of course, the identifier 2 is not limited to the two-dimensional code, and may be a character string, one-dimensional code, electronic tag, or the like.

Alignment positions for appropriately disposing each of the examination units with respect to the subject eye are preset in the plurality of examination units 1. Such an alignment position may be a position corresponding to the examination optical system of each examination unit (details will be described later). Each of the examination units includes a control unit (not shown) that performs various controls, and a storage device (not shown). The storage device stores an examination program using the examination optical system, and the like.

Robot Mechanism

Figure 2:
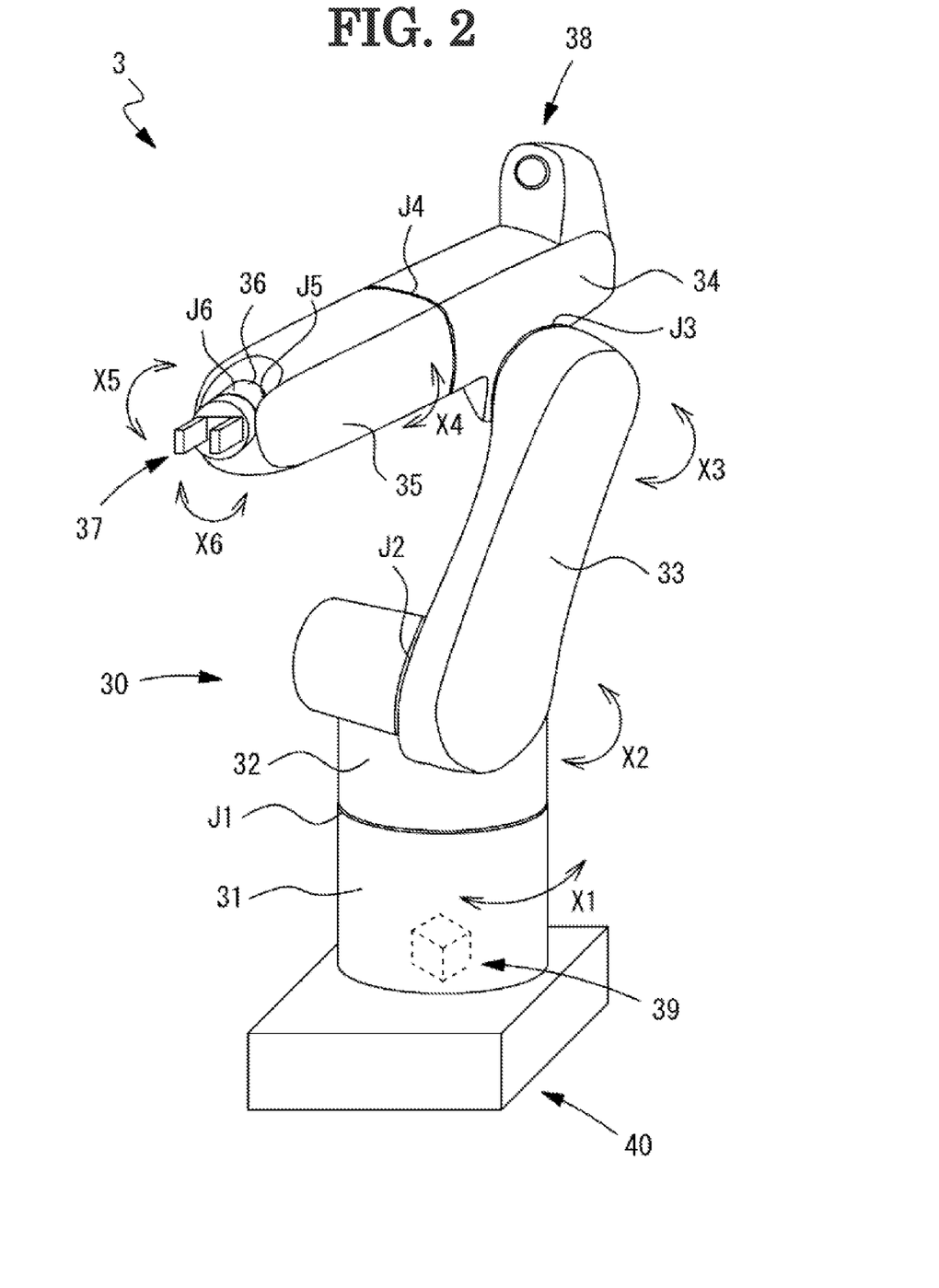
FIG. 2 is a diagram showing a configuration of a robot mechanism.

FIG. 2 is a diagram showing a configuration of the robot mechanism 3. The robot mechanism 3 may include various configurations such as a serial link mechanism and a parallel link mechanism. The robot mechanism 3 holds and moves three-dimensionally one of the plurality of examination units 1. The robot mechanism 3 includes a base stand 40, a moving unit 30, a holding unit 37, a face detection unit 38, a control unit 39, and the like.

The base stand 40 is fixed to an installation surface. For example, the installation surface may be a floor surface or a ceiling surface extending in a horizontal direction, a wall surface extending in a vertical direction, or the like. The moving unit 30 (more specifically, a base portion 31 of the moving unit 30) is fixed to the base stand 40. The moving unit 30 may be fixed directly to the installation surface without the base stand 40 interposed therebetween.

The moving unit 30 may be an arm that has a plurality of joints (shafts) and changes its posture by rotating each portion via the joints. Inside the moving unit 30, a motor (for example, a step motor or the like) is built in for rotating each portion about each of rotation axes X1 to X6. In FIG. 2, each of the rotation axes X1 to X6 is shown by showing a circumferential direction about the rotation axes X1 to X6.

Specifically, the moving unit 30 includes the base 31, a shoulder 32, a lower arm 33, a first upper arm 34, a second upper arm 35, a wrist 36, the holding unit 37, and the like. The base 31 supports the moving unit 30 as a whole. The shoulder 32 is connected to an upper portion of the base 31 via the first joint unit J1. The shoulder 32 rotates with respect to the base 31 about the rotation axis X1 extending in a direction that intersects the base stand 40 (vertical direction in the present example). One end portion of the lower arm 33 is connected to a portion of the shoulder 32 via the second joint unit J2. The lower arm 33 rotates with respect to the shoulder 32 about the rotation axis X2 extending in the horizontal direction. The first upper arm 34 is connected to the end portion of the lower arm 33 opposite to a side connected to the shoulder 32 via the third joint unit J3. The first upper arm 34 rotates with respect to the lower arm 33 about the rotation axis X3 extending in the horizontal direction. The second upper arm 35 is connected to the distal end portion side of the first upper arm 34 (side where the holding unit 37 is provided) via the fourth joint unit J4. The second upper arm 35 rotates with respect to the first upper arm 34 about the rotation axis X4. The wrist 36 is connected to the distal end portion side of the second upper arm 35 via the fifth joint unit J5. The wrist 36 rotates with respect to the second upper arm 35 about the rotation axis X5. The holding unit 37 is connected to the distal end portion side of the wrist 36 of the moving unit 30 via the sixth joint unit J6. The holding unit 37 rotates with respect to the wrist 36 about the rotation axis X6.

The holding unit 37 holds and releases one of the plurality of examination units 1. As an example, the holding unit 37 holds and releases the examination unit by generating a magnetic force in a holding piece. However, it is also possible to change the method of holding and releasing the examination unit. For example, the holding unit 37 may switch between holding and releasing of the examination unit by changing a distance between the holding pieces using an actuator. A power source for the actuator may be electrical, hydraulic, pneumatic, or the like. Further, for example, the holding unit 37 may switch between holding and releasing of the examination unit by switching between adsorption and release of the examination unit.

Each portion of the moving unit 30 is provided with a detection unit (for example, an encoder or the like) for detecting an angle of each portion (for example, an angle of the shoulder 32 with respect to the base 31, an angle of the lower arm 33 with respect to the shoulder 32, or the like). The three-dimensional position of the holding unit 37 provided at the distal end portion of the moving unit 30 and the like are indexed by detecting all the angles of each portion by the detection unit.

The face detection unit 38 detects the face of the examinee. The face detection unit 38 includes an imaging optical system for detecting the face of the examinee. For example, the imaging optical system may mainly have an imaging lens and an imaging device.

It is preferable that the face detection unit 38 be provided at a position where an imaging range is not blocked by the examination unit even when each examination unit is held by the holding unit 37. For example, in the present example, the face detection unit 38 is fixed to the moving unit 30 and moves together with the moving unit 30. As an example, the face detection unit 38 is fixed to the first upper arm 34. However, the face detection unit 38 may be fixed to a portion different from the first upper arm 34. The face detection unit 38 may be configured not to move together with the moving unit 30, and in this case, the face detection unit 38 may be fixed to the base stand 40.

The face detection unit 38 may also have a function of measuring a distance from the face detection unit 38 to the face (in some cases, the examination unit). In other words, the imaging optical system of the face detection unit 38 may be used to measure a distance from the face detection unit 38 (moving unit 30) to the object. In this case, the face detection unit 38 may be configured as a so-called stereo camera that measures distance based on parallax, and may be provided with a plurality of stereo cameras in the horizontal direction, for example. Of course, apart from the face detection unit 38, a distance sensor using infrared rays or the like may be provided.

The face detection unit 38 may also function as an identifier detection unit that detects the identifiers 2 provided on the housings of the plurality of examination units 1. That is, the identifier 2 may be captured using the imaging optical system of the face detection unit 38. Of course, an identifier detection unit may be provided separately from the face detection unit 38. In this case, the identifier detection unit may be fixed to the moving unit 30. In this case, the identifier detection unit may be installed at a location different from the moving unit 30. For example, it may be installed on the base stand 40, may be installed on a shelf on which a plurality of examination units 1 are disposed, or may be installed on a floor surface, a wall surface, a ceiling surface, or the like of an examination room. A monitoring camera or the like provided in an examination room R2 may also be used.

The control unit 39 performs various controls (for example, control of a motor that rotates each portion, control of generating a magnetic force in the holding unit 37, or the like).

Controller

Returning to the description of FIG. 1. The controller 5 controls the entire ophthalmic system 100. As an example, a personal computer is used for the controller 5. However, a device different from a personal computer (for example, at least one of a server, a tablet terminal, a smart phone, and the like) may be used as the controller 5. At least one control unit of the plurality of examination units 1 and the robot mechanism 3 may function as a control unit that controls the entire ophthalmic system 100. The control units of a plurality of devices may work together to control the entire ophthalmic system 100.

The controller 5 includes a CPU 51 that performs various control processes, and a storage device (NVM) 52. The storage device 52 stores alignment positions and the like in each of the examination units. The controller 5 is connected to the plurality of examination units 1 and the robot mechanism 3 via at least one of wired communication, wireless communication, network, and the like.

An operation unit 6 and a display unit 7 are connected to the controller 5. The operation unit 6 is operated by an operator to input various instructions to the ophthalmic system 100 by the operator. For example, at least one of a keyboard, a mouse, a touch panel, and the like can be used for the operation unit 6. A microphone or the like for inputting various instructions may be used together with the operation unit 6 or instead of the operation unit 6. The display unit 7 displays various images. Needless to say, instead of the operation unit 6 and the display unit 7 externally connected to the controller 5, the operation unit and the display unit included in the controller 5 may be used.

A power unit 8 is also connected to the controller 5. The power unit 8 supplies power to the robot mechanism 3 and supplies power to each of the examination units held by the holding unit 37 of the robot mechanism 3 via the holding unit 37. For example, the power unit 8 may supply power to the examination unit in a case where the holding detection unit described later detects that the examination unit is held by the holding unit 37. The examination unit is energized by being held by the holding unit 37, receives power from the robot mechanism 3, and become usable. That is, in a state where the examination unit and the robot mechanism 3 are connected, the examination unit and the robot mechanism 3 as a whole function as the examination device. Each of the examination units may be charged at the above-described storage position to store power. In this case, the examination unit may be configured to be energized by being held by the holding unit 37, draw power from a built-in storage battery, and become usable.

Holding by Robot Mechanism of Examination Unit

Each of the examination units and holding unit 37 are held by fitting the connection unit 4 provided in the examination unit and the holding piece of the holding unit 37. On the rear surface of the housing of the examination unit, the connection unit 4 may be provided at a position where the optical axis of the examination optical system and the rotation axis X6 of the holding unit 37 are matched.

The connection unit 4 and the holding piece are provided with a holding detection unit capable of detecting fitting between the connection unit 4 and the holding piece. For example, the holding detection unit may be configured by an optical sensor such as a photointerrupter, may be configured by a displacement sensor including a detection body and a contact, or may be configured by an ultrasonic sensor for transmitting an ultrasonic wave and receiving its reflected wave. Of course, the holding detection unit may be configured by a sensor different from these.

In the present example, the connection unit 4 is a concave portion, and a magnet may be provided on a bottom surface of the concave portion. Moreover, the holding piece of the holding unit 37 may be a projection portion, and an electromagnet may be provided on a top surface of the projection portion. These magnet and electromagnet are used as lock mechanism. For example, in a case where the holding unit 37 is inserted into the connection unit 4 by the control unit 39, and the holding detection unit detects the fitting between the holding piece and the connection unit 4 (in other words, holding of the examination unit by the holding unit 37), the control unit 39 generates a magnetic force of the electromagnet by electrical control to fix these fittings. For example, in a case where the holding unit 37 (holding piece) is removed from the connection unit 4, the control unit 39 stops the generation of the magnetic force of the electromagnet and releases the fitting fixation. In addition, the lock mechanism is not limited to the configuration based on electrical control, and may include a configuration based on physical control. For example, the lock mechanism may be configured of a cam mechanism or the like.

Alignment Position of Examination Unit

Each examination unit of the plurality of examination units 1 has an alignment position with respect to the subject eye (in other words, the three-dimensional position of the examination unit with respect to the three-dimensional position of the subject eye), and there is an alignment position for the examination optical system in the housing is appropriately used. There may be a spatial tolerance range in the alignment position of the examination unit.

Figure 3A:
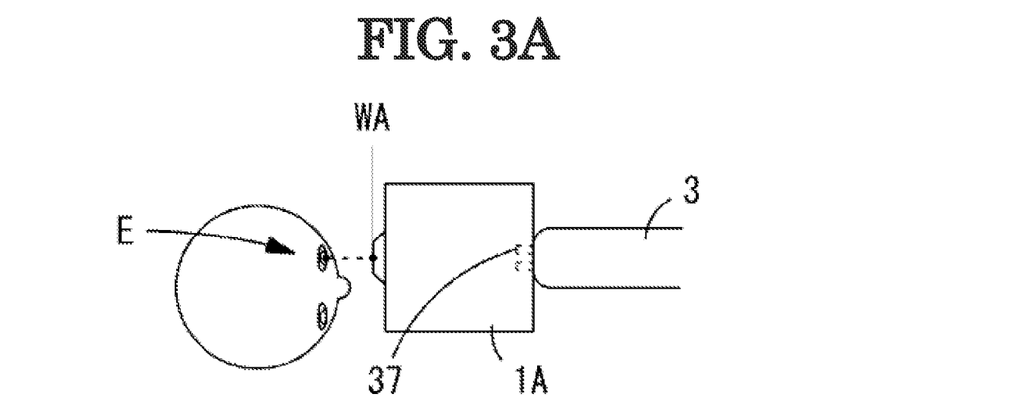
FIGS. 3A and 3B are diagrams showing alignment positions of an examination unit with respect to a subject eye.
Figure 3B:
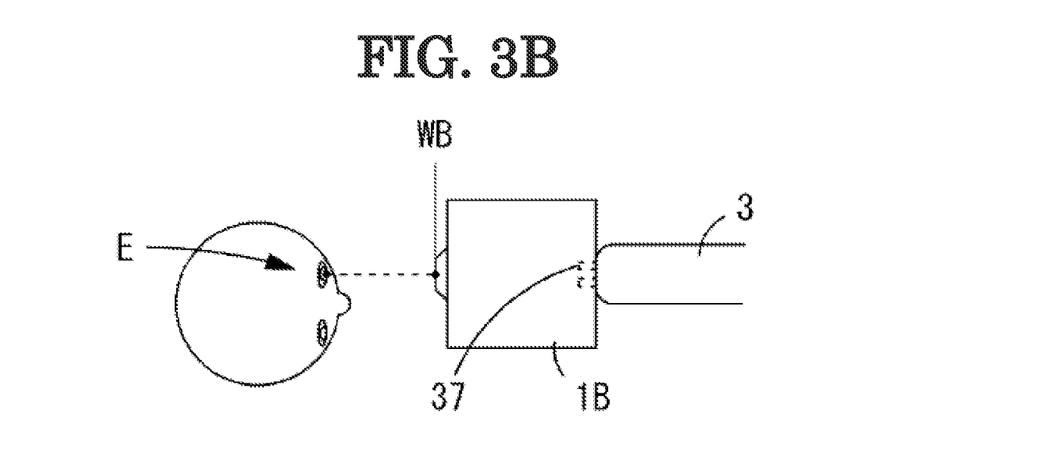

FIGS. 3A and 3B are diagrams showing alignment positions of the examination unit with respect to a subject eye E of an examinee P. FIG. 3A shows a first alignment position WA of the first examination unit 1A. FIG. 3B shows a second alignment position WB of the second examination unit 1B. In addition, in FIGS. 3A and 3B, only the alignment position of the front-rear direction with respect to the subject eye E is shown for convenience.

For example, the first alignment position WA of the first examination unit 1A is a position where a predetermined pressure can be applied to the cornea by applying air or ultrasonic waves to the subject eye E. For example, the second alignment position WB of the second examination unit 1B is a position where the fundus of the subject eye E can be focused and a tomographic image thereof can be captured. For example, with respect to the subject eye E, the first alignment position WA is at a short distance, and the second alignment position WB is at a far distance.

Such alignment positions for each examination unit may be stored in the storage device 52. As an example, the alignment positions may be stored in the storage device 52 in association with the identifier 2 provided on the housing.

Control Operation

An examination operation using the ophthalmic system 100 will be described.

Figure 4:
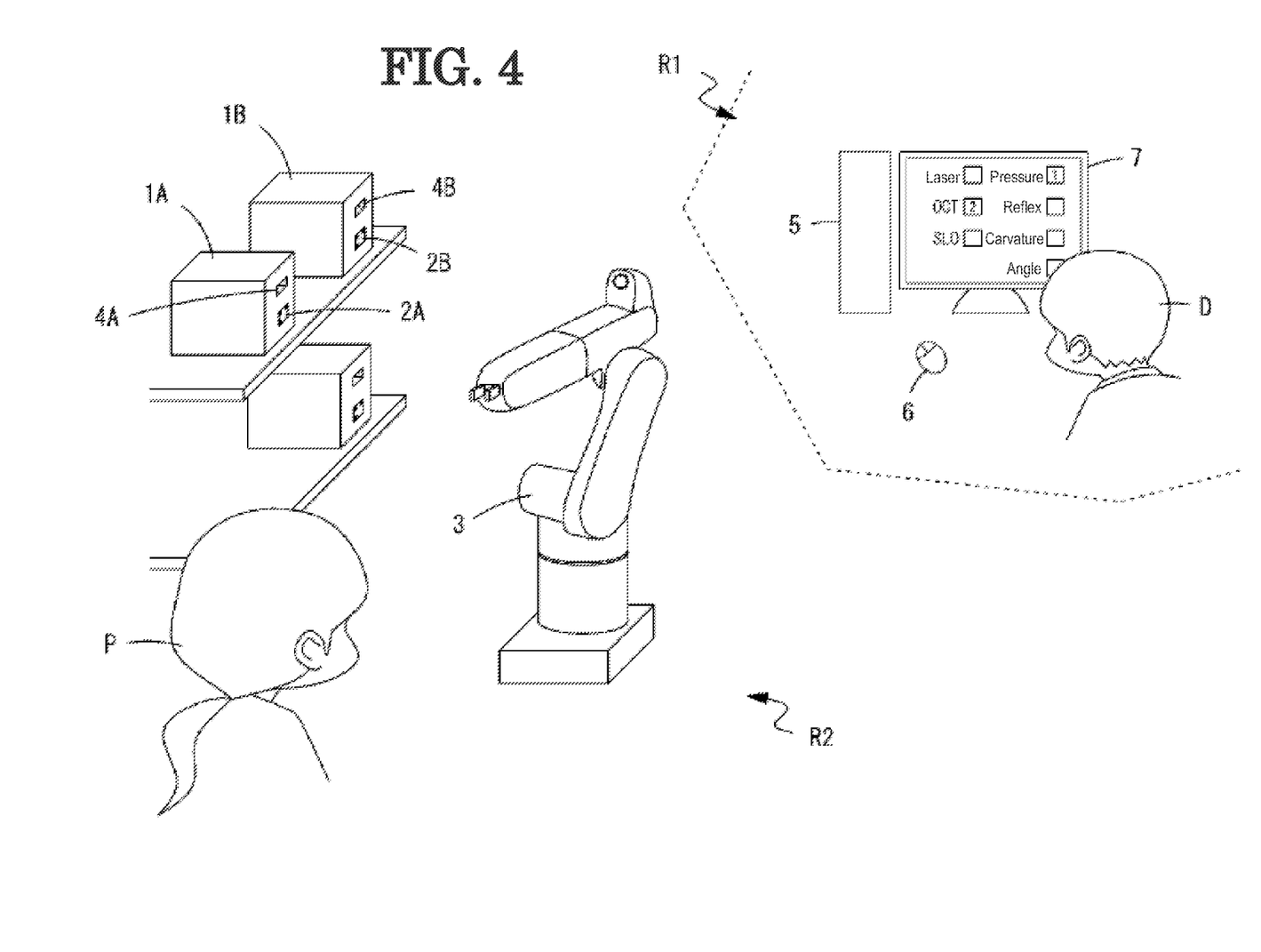
FIG. 4 is a diagram showing a usage example of the ophthalmic system.
Figure 5:
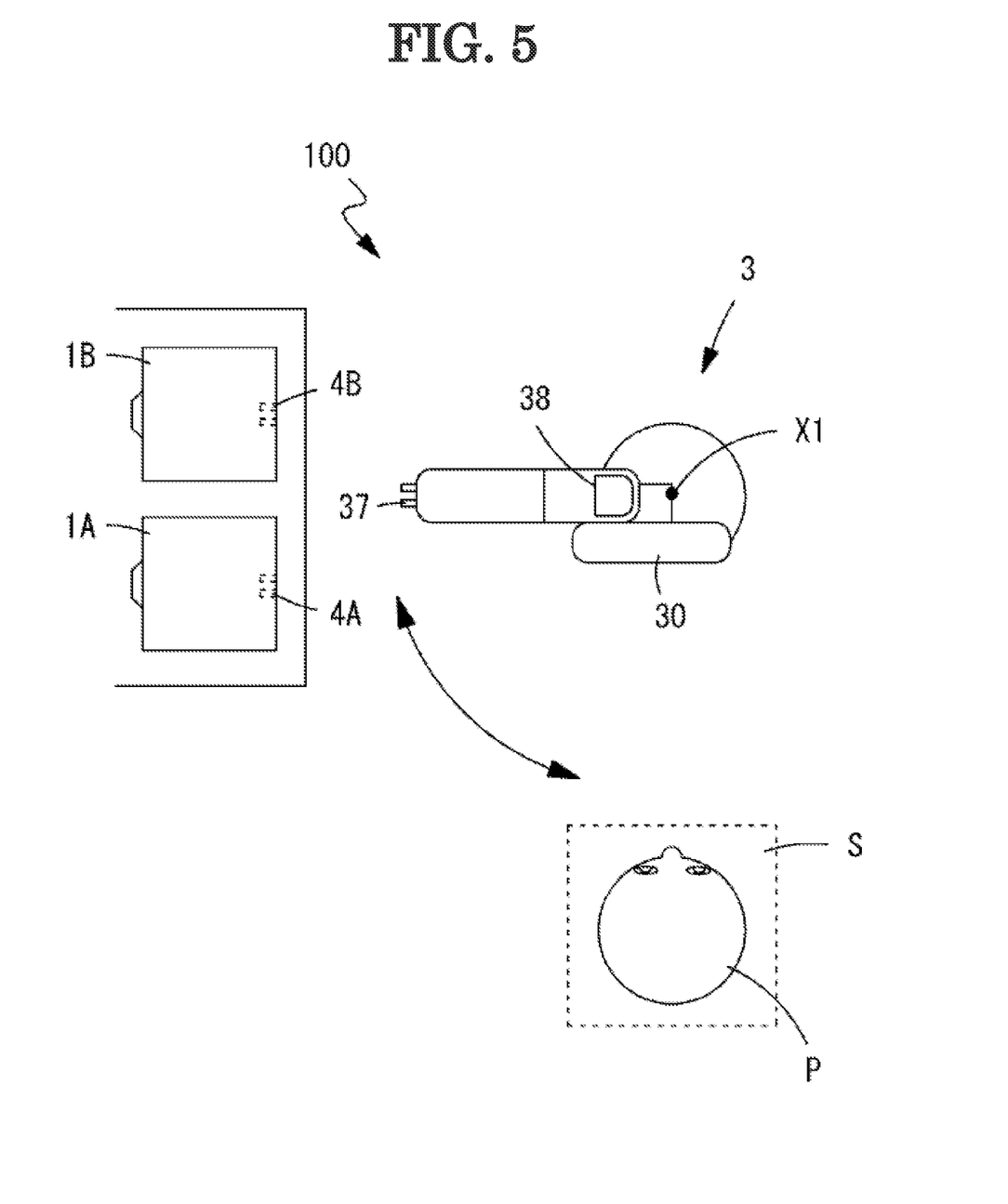
FIG. 5 is a plan view showing a placement of the ophthalmic system.

FIG. 4 is a diagram showing a usage example of the ophthalmic system 100. FIG. 5 is a plan view showing the disposition of the ophthalmic system 100. In the present example, the plurality of examination units 1, the robot mechanism 3, and a standby position S of the examinee P are disposed in an L-shape about the rotation axis X1 of the robot mechanism 3. Of course, they may be disposed differently, such as in an I-shape.

In a consultation room R1, an examiner D interviews the examinee P, and the type and order of examinations to be performed on the subject eye are determined. For example, the examiner operates the operation unit 6 and sequentially selects the corresponding examination from a list of examination types displayed on the display unit 7. The controller 5 sets the target examination unit based on the type of examination and the order in which the target examination units are held in the holding unit 37 according to a selection signal from the operation unit 6. For example, in a case where it is selected to first measure the intraocular pressure of the subject eye and then capture the fundus tomographic image, the first examination unit 1A and the second examination unit 1B are set in this order.

The examinee P is guided to the examination room R2 where the subject eye is examined. The plurality of examination units 1 and the robot mechanism 3 are installed in the examination room R2. The examinee P waits for the start of the examination at a standby position S within a predetermined range about the robot mechanism 3 (for example, within a movable range of the moving unit 30).

Identification of Examinee

In the present example, the examinee P may be identified. The controller 5 transmits (outputs) a movement signal for moving the moving unit 30 to the control unit 39 provided in the robot mechanism 3. The control unit 39 rotates each portion of the moving unit 30 based on the received (input) movement signal. As a result, the holding unit 37 is directed toward the examinee P, and the face of the examinee P is captured by the face detection unit 38. In addition, the control unit 39 transmits a captured image (live image) including at least part of the face captured by the face detection unit 38 to the controller 5. The controller 5 receives the captured image and analyzes the captured image. For example, biometric information of the examinee P (for example, face, iris, or the like) may be detected. Therefore, the examinee P is identified.

In addition, the identification of the examinee P is not limited to the capturing of the face of the examinee P, but may be performed by capturing the fingerprint of the examinee P, identification information passed to the examinee P (for example, a character string, a one-dimensional code, two-dimensional code, or the like), or the like. Of course, identification using voice of the examinee P, an electronic tag, or the like may be performed.

Holding of First Examination Unit

When the identification of the examinee P is completed, the order of holding the examination units is transmitted from the controller 5 to the control unit 39. The control unit 39 causes the holding unit 37 to hold the first examination unit 1A based on the order in which the examination units are held.

For example, the control unit 39 rotates each portion of the moving unit 30 to direct the holding unit 37 from the examinee P to the shelf. As a result, the captured images captured by the face detection unit 38 show a plurality of examination units 1.

The controller 5 acquires and analyzes the captured image, reads the identifier 2 provided in each examination unit, and searches for the first examination unit 1A. Further, the controller 5 analyzes the captured image and acquires the distance from the face detection unit 38 (holding unit 37) to the first examination unit 1A. For example, the position of the holding unit 37 with respect to the face detection unit 38 is known from the lengths of the first upper arm 34, the second upper arm 35, and the wrist 36. Therefore, the distances in the left-right direction, the up-down direction, and the front-rear direction at which the first examination unit A is located with respect to the holding unit 37 are grasped (that is, the three-dimensional position of the first examination unit A with respect to the holding unit 37 is grasped).

The controller 5 transmits the movement signal to the control unit 39 based on the three-dimensional position of the first examination unit 1A. The control unit 39 brings the holding unit 37 closer to the first examination unit 1A based on the movement signal, and causes the holding unit 37 to selectively hold the first examination unit 1A. By connecting the holding unit 37 and the first examination unit 1A, the first examination unit 1A becomes usable, and the examination results and the like obtained by the first examination unit 1A are in a transmittable state to the controller 5.

Grasping of Three-Dimensional Position of Examinee

Figure 6:
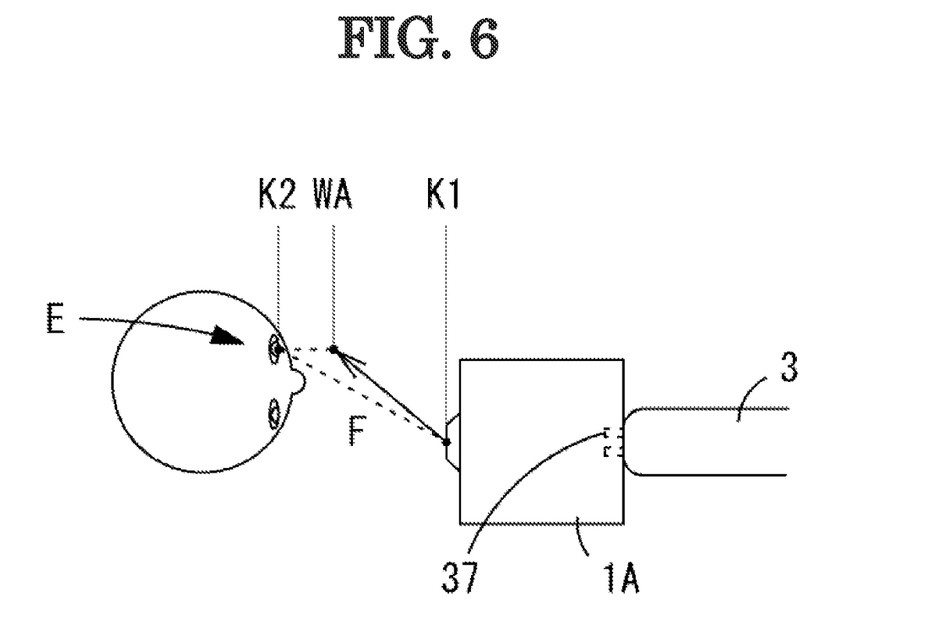
FIG. 6 is a diagram showing a positional relationship among a subject eye, a first examination unit, and a first alignment position.

FIG. 6 is a diagram showing the positional relationship among the subject eye E, the first examination unit 1A, and the first alignment position WA. In FIG. 6, only each three-dimensional position in the front-rear direction of the subject eye E is shown for convenience.

The control unit 39 rotates each portion of the moving unit 30 to direct the holding unit 37 (first examination unit 1A) from the shelf toward the examinee P. The face detection unit 38 starts capturing the face of the examinee P again. The controller 5 acquires and analyzes the captured image by the face detection unit 38, and grasps the distance F from the face detection unit 38 (first examination unit 1A) to the subject eye E. A position K1 of the first examination unit 1A with respect to the face detection unit 38 (more specifically, the position K1 of the front surface of the housing of the first examination unit 1A) is known by the length of each portion in the moving unit 30 and the length of the housing of the first examination unit 1A. Therefore, the distances in the left-right direction, the up-down direction, and the front-rear direction in which the subject eye E is positioned with respect to the first examination unit A are grasped (that is, a three-dimensional position K2 of the subject eye E with respect to the first examination unit 1A is grasped).

Positioning Subject Eye and First Examination Unit

Based on the three-dimensional position K1 of the subject eye E, the controller 5 sets the first alignment position WA according to the first examination unit 1A. Further, the controller 5 transmits a movement signal to the control unit 39 so as to match the position K1 of the first examination unit 1A and the first alignment position WA. Based on the movement signal, the control unit 39 rotates each portion of the moving unit 30 to move the first examination unit 1A to the first alignment position WA. Thereby, for example, the first examination unit 1A can be substantially aligned with the subject eye E.

In aligning the subject eye E with the first examination unit 1A, the face of the examinee P is not limited to necessarily face the front. For example, the examinee P may be in a state where the head is tilted and the face may be tilted left or right. Further, for example, the examinee P may be in a state of looking down or looking up, and the face may be tilted up or down. Further, for example, the examinee P may be in a state where the body is tilted and the face is tilted forward and backward. Of course, a combination of these states may cause the face to be tilted. Therefore, the controller 5 may analyze the image captured by the face detection unit 38 and detect the tilt of the face of the examinee P.

Figure 7A:
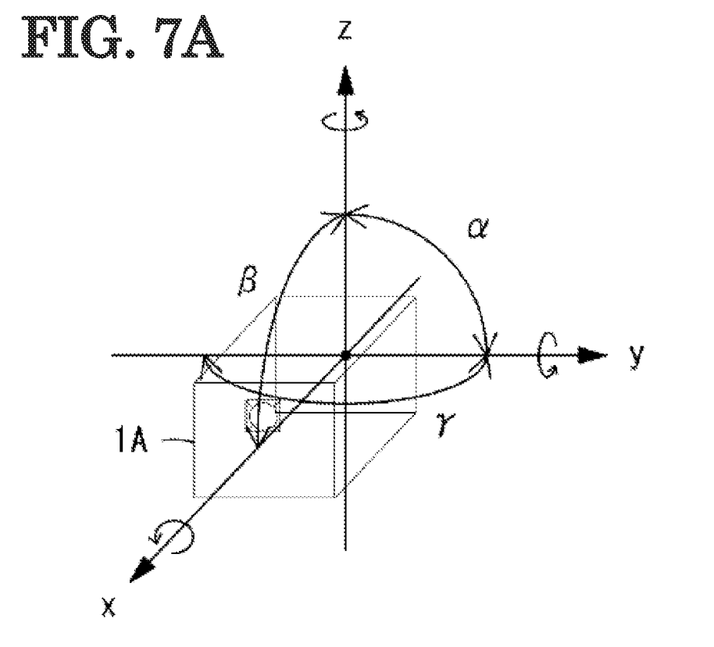
FIGS. 7A to 7D are diagrams for explaining an angle of the first examination unit.
Figure 7B:
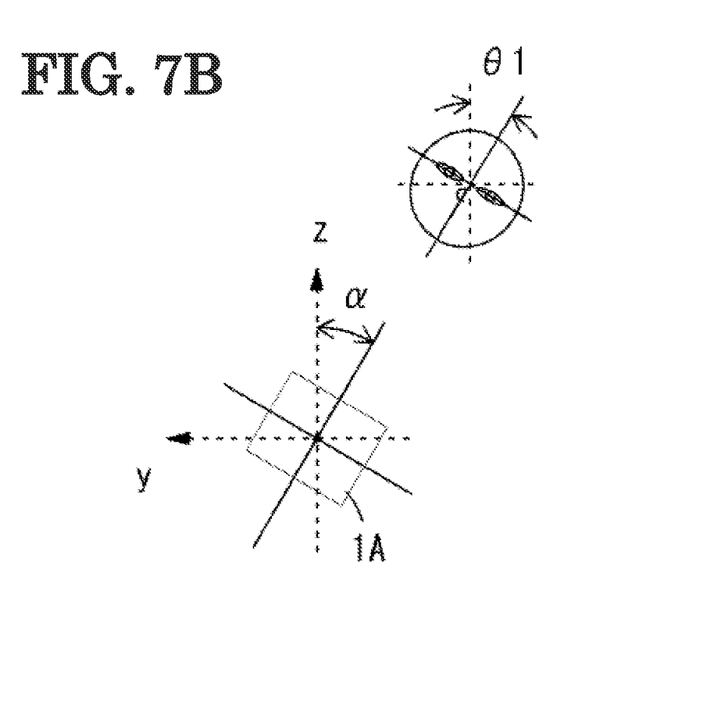
Figure 7C:
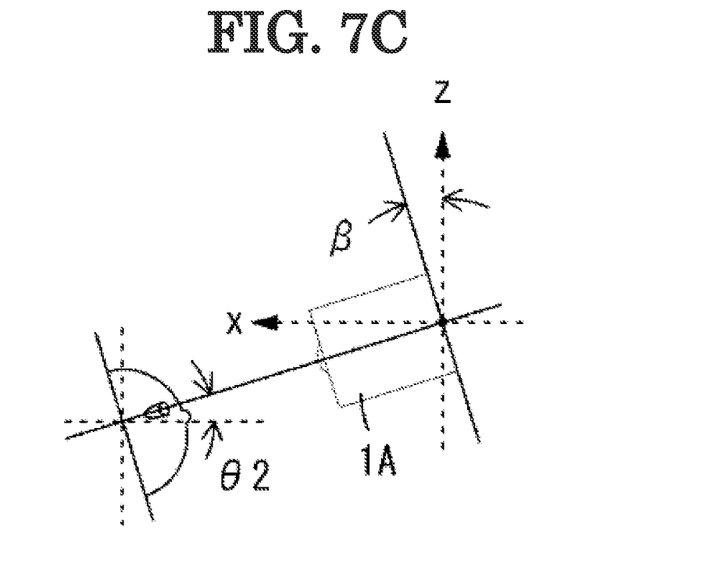
Figure 7D:
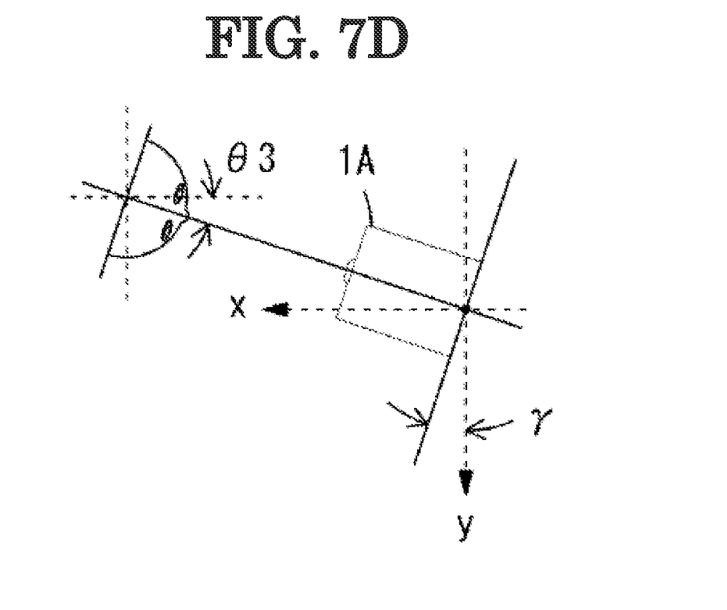

FIGS. 7A to 7D are diagrams for explaining the angle of the first examination unit 1A. FIG. 7A shows a roll angle $\alpha$, a pitch angle $\beta$, and a yaw angle $\gamma$ of the first examination unit 1A. FIGS. 7B to 7D show changes in the angle of the first examination unit 1A with respect to displacement of the face of the examinee P. For example, in a case where the controller 5 analyzes the captured image of the face detection unit 38 and detects the left-right tilt θ1 of the face, the movement signal considering the tilt θ1 is transmitted to the control unit 39. Further, for example, in a case where the controller 5 analyzes the captured image and detects the up-down tilt θ2 of the face, the movement signal considering the tilt θ2 is transmitted to the control unit 39. Further, for example, in a case where the controller 5 analyzes the captured image and detects the front-rear tilt θ3 of the face, the movement signal considering the tilt θ3 is transmitted to the control unit 39.

The control unit 39 adjusts at least one of the roll angle α, the pitch angle β, and the yaw angle γ of the first examination unit 1A by rotating each portion of the moving unit 30 based on the movement signal. For example, the control unit 39 adjusts the roll angle α (in other words, the rotation angle with respect to the x-axis) of the first examination unit 1A so as to match the tilt θ1. Further, for example, the control unit 39 adjusts the pitch angle β (in other words, the rotation angle with respect to the y-axis) of the first examination unit 1A so as to match the tilt θ2. Further, for example, the control unit 39 adjusts the yaw angle γ (in other words, the rotation angle with respect to the z-axis) of the first examination unit 1A so as to match the tilt θ3. Thereby, regardless of the posture of the examinee P, the first examination unit 1A can be aligned.

After the substantial alignment of the subject eye E and the first examination unit 1A is completed, these fine alignments are subsequently performed. For example, the intraocular pressure measurement optical system provided in the first examination unit 1A has a fixation target projection system, an alignment index projection system, an anterior segment observation system, an ultrasonic irradiation unit, and the like. The control unit included in the first examination unit 1A turns on a fixation lamp for gazing the line of sight of the subject eye E, and projects an alignment index onto the cornea of the subject eye E. In addition, the control unit acquires an anterior segment observed image including an alignment index image of the subject eye E, and uses the alignment index image to detect the deviation amount between the corneal vertex of the subject eye E and the optical axis of the ultrasonic irradiation unit.

The control unit of the first examination unit 1A transmits the movement signal based on such a deviation amount to the control unit 39 of the robot mechanism 3. The control unit 39 adjusts the three-dimensional position of the first examination unit 1A based on the received movement signal. As a result, for example, the first examination unit 1A can be finely aligned with respect to the subject eye E. That is, the first examination unit 1A can be appropriately disposed with respect to the subject eye E.

Implementation of Examination Using Examination Unit

When fine alignment between the subject eye E and the first examination unit 1A is completed, intraocular pressure measurement using the first examination unit 1A is started. For example, ultrasonic waves are emitted from the ultrasonic irradiation unit toward the subject eye E, and the intraocular pressure of the subject eye E is measured based on the magnitude of the acoustic radiation pressure generated by the ultrasonic waves. The configuration of the intraocular pressure measurement optical system and the details of intraocular pressure measurement using the intraocular pressure measurement optical system are described, for example, in JP2020-5679A. The obtained measurement data and the like may be displayed on the display unit 7 via the controller 5.

After finishing the examination using the first examination unit 1A, the examination using the second examination unit 1B is performed. The controller 5 transmits the movement signal to the control unit 39 so as to direct the first examination unit 1A from the examinee P to the shelf and dispose the first examination unit 1A at the original storage position. Further, the controller 5 transmits the movement signal to the control unit 39 so that the first examination unit 1A is released from the holding unit 37 and the second examination unit 1B is held by the holding unit 37.

The control unit 39 rotates each portion of the moving unit 30 based on the movement signal, and changes the examination unit held by the holding unit 37 from the first examination unit 1A to the second examination unit 1B. In addition, the control unit 39 aligns the second examination unit 1B with the subject eye E in the same manner as the first examination unit 1A. Accordingly, the tomographic image of the subject eye E can be captured using the tomographic imaging optical system provided in the second examination unit 1B.

As described above, for example, the ophthalmic system according to the present example can perform different examinations on the subject eye by replacing the examination unit held by the holding unit of the robot mechanism, and controls driving of the robot mechanism to adjust the relative positional relationship between the subject eye and the examination unit. Since one robot mechanism can be shared and various examinations can be performed using a common alignment mechanism, space can be saved and examinations can be efficiently performed.

Further, for example, since the ophthalmic system of the present example sets the alignment position according to the examination unit to be held by the holding unit of the robot mechanism, and adjusts the relative positional relationship between the subject eye and the examination unit, the position of the examination unit is adjusted to the alignment position. For example, since the appropriate distance from the subject eye to the examination unit differs for each examination unit, the examination can be performed with high accuracy by adjusting the alignment position.

Further, for example, the ophthalmic system in the present example has the detection unit that detects the face of the examinee, and moves the moving unit based on the detection result of the face detection unit to adjust the relative positional relationship between the subject eye and the examination unit. By estimating the position of the face of the examinee from the detection result of the detection unit, the examination unit can be disposed at the correct position with respect to the subject eye.

Further, for example, in the ophthalmic system according to the present example, the control device can cause the holding unit to hold or release the examination unit to replace the examination unit held by the holding unit, and thereby different examinations can be performed on the subject eye. Therefore, the examiner (or the assistant) does not necessarily need to be near the examinee, and the examination can be performed efficiently. In addition, remote examination and the like can be handled.

For example, the ophthalmic system in the present example has the identifier on the housing of the examination unit and detects the identifier. Thereby, the controller can select the examination unit using the identifier, and can easily hold the corresponding examination unit in the holding unit.

Further, for example, the ophthalmic system in the present example includes the arm having the plurality of joints in the robot mechanism, at least one of the plurality of joints has the rotation axis, and by rotating the rotation axis, the angle of the examination unit held by the holding unit is adjusted. For example, at least one of the roll angle, the pitch angle, and the yaw angle of the examination unit is adjusted according to the posture of the examinee. By providing the rotation axis in the robot mechanism, it is possible to perform appropriate alignment in consideration of deviation of the face of the examinee.

Modified Example

Although the ophthalmic system 100 of the present example has been described with an example of a configuration in which the robot mechanism 3 is of a fixed type, but the configuration is not limited to this. The ophthalmic system 100 may be configured such that the robot mechanism 3 is of a mobile type. For example, in this case, the base stand 40 of the robot mechanism 3 may be provided with a parallel movable unit that moves the moving unit 30 in a direction parallel to the installation surface. The moving unit 30 as a whole moves in parallel on the installation surface by driving a parallel movable unit.

The parallel movement using the parallel movable unit of the moving unit 30 may be manually performed by the operator. In this case, for example, the parallel movable unit may be configured with wheels. Moreover, the parallel movement using the parallel movable unit of the moving unit 30 may be automatically performed by the control unit 39. In this case, for example, the parallel movable unit may be configured to include wheels and motors for rotating the wheels. Moreover, for example, a belt conveyor or the like may be configured to function as the parallel movable unit.

The ophthalmic system 100 of the present example has been described with an example of a configuration in which the robot mechanism 3 is provided with the face detection unit 38, but the configuration is not limited to this. The ophthalmic system 100 may be configured to provide the face detection unit 38 separately from the robot mechanism 3. For example, in this case, the ophthalmic system 100 may include a face detection mechanism including a face detection unit, along with the plurality of examination units 1, the robot mechanism 3, and the controller 5. For example, the face detection mechanism may be disposed on the side of the robot mechanism 3 or may be disposed above the robot mechanism 3.

The ophthalmic system 100 of the present example has been described with an example of a configuration in which the first examination unit 1A and the second examination unit 1B are automatically changed by the controller 5 and the control unit 39, but the configuration is not limited to this. The ophthalmic system 100 may be configured such that the examiner D (or the assistant who assists the operation of the examiner D) manually replaces the first examination unit 1A and the second examination unit 1B. That is, the configuration may be provided such that each examination unit can be manually held or released. For example, in this case, each examination unit may be provided with a handle or hole to facilitate transporting each examination unit from the storage position on the shelf to the holding unit 37.

The ophthalmic system 100 of the present example has been described with an example of a configuration in which alignment of the subject eye E and the examination unit are performed in two steps of substantial alignment and fine alignment, but the configuration is not limited to this. The ophthalmic system 100 may detect the deviation amount between the corneal vertex of the subject eye E and the optical axis of the ultrasonic irradiation unit from the beginning, and perform alignment in one step.

The ophthalmic system 100 of the present example has been described with an example of a configuration including one robot mechanism 3, but the configuration is not limited to this. The ophthalmic system 100 may include a plurality of robot mechanisms 3. Each of the plurality of robot mechanisms 3 is driven independently, and it is also possible to perform examinations on a plurality of examinees P in parallel (simultaneously). For example, in this case, the controller 5 acquires the types of examinations to be performed on the plurality of examinees P, and when it is necessary to use the same examination unit, control may be performed so that timings of holding the examination unit in each holding unit 37 do not overlap.

As an example, for two examinees, a case is exemplified in which measurement of intraocular pressure (first examination unit 1A), capture of fundus tomographic image (second examination unit 1B), and measurement of eye refractive power (here, the third examination unit) are all implemented. At this time, the controller 5 may control one robot mechanism so as to hold the examination units in order of the first examination unit 1A, the second examination unit 1B, and the third examination unit for one examinee. The controller 5 may control another robot mechanism so as to hold the examination units in the order of the third examination unit, the first examination unit 1A, and the second examination unit 1B for the other examinee. Thereby, each of the plurality of examination units 1 can be shared by two robot mechanisms, and the examination time can be shortened and the efficiency can be improved.

In the ophthalmic system 100 of the present example, when the holding unit 37 of the robot mechanism 3 holds the examination unit, the weight of the examination unit may tilt each portion of the moving unit 30 in the rotation direction of the rotation axis. Specifically, for example, the wrist 36 may be tilted in the rotation direction of the rotation axis X5, or the first upper arm 34 may be tilted in the rotation direction of the rotation axis X3. Therefore, the controller 5 may detect the tilt of each portion caused by holding the examination unit and correct the three-dimensional position of the examination unit (holding unit 37). Alternatively, calibration may be performed based on the tilt of each portion while holding the examination unit.

The ophthalmic system 100 of the present example may store information relating to the posture of the examinee P in the storage device. For example, such information may be angles representing the tilts of the face of the examinee P (that is, the tilt θ1, the tilt θ2, and the tilt θ3), or angles of the examination unit when the examination unit is aligned with the subject eye E (that is, the roll angle α, the pitch angle β, and the yaw angle γ). For example, the posture of the examinee P may affect the examination result of the subject eye E. As an example, the intraocular pressure value may change depending on the posture of the examinee P. For this reason, each examination unit may correct the obtained examination result based on information relating to the posture.

The ophthalmic system 100 of the present example has been described with an example of a configuration in which different examinations (that is, the first examination and the second examination) are performed on the subject eye, but the configuration is not limited to this. In the present example, the ophthalmic system 100 may be configured to perform different examinations and surgeries for the subject eye. In this case, the ophthalmic system 100 may include a plurality of units having different housings and capable of performing different examinations or surgeries. For example, each unit may have either an examination optical system or a surgical optical system (for example, a therapeutic laser optical system, or the like). Thereby, various combinations of examinations and surgeries can be performed for the subject eye. Specifically, a first surgery and a second surgery different from the first surgery can be performed for the subject eye. The first surgery and the first examination can be performed for the subject eye.

The ophthalmic system 100 of the present example may be configured such that the examiner can use it for patrol examination or the like. For example, the ophthalmic system 100 may include a vehicle and be transportable by mounting the plurality of examination units 1, the robot mechanism 3, and the controller 5 on the vehicle. In this case, the ophthalmic system 100 may include an adjustment step of adjusting the relative positional relationship between the subject eye and the examination unit held by the holding unit, and a replacement step of replacing the examination unit for capable of performing different examinations for the subject eye. As a result, even in a case where it is difficult for the examinee to visit a medical institution, the examiner can visit the examinee and perform various examinations. In addition, although the vehicle is too narrow to carry a large number of stationary devices, such an ophthalmic system allows a plurality of examination units to be loaded in a space-saving manner in the vehicle. Of course, it is possible to perform not only examination but also surgery.

That is, the present example discloses the ophthalmic system for examining the subject eye, which includes the vehicle accommodating the plurality of examination units having housings different from each other, performing examinations different from each other, and having at least a first examination unit and a second examination unit, the robot mechanism having the holding unit that holds and releases either the first examination unit or the second examination unit, and the moving unit that is connected to the holding unit and moves three-dimensionally, and controller for controlling driving of the robot mechanism and adjusting the relative positional relationship between the subject eye and the first examination unit or the second examination unit held by the holding unit.

In addition, the present example discloses the ophthalmic system for examining or performing surgery on the subject eye, which includes the vehicle accommodating a plurality of units having housings different from each other, performing examinations or surgeries different from each other, and having at least a first unit and a second unit, the robot mechanism having the holding unit for holding and releasing either the first unit or the second unit, and the moving unit that is connected to the holding unit and moves three-dimensionally, and controller for controlling driving of the robot mechanism and adjusting the relative positional relationship between the subject eye and the first unit or the second unit held by the holding unit.

The present example discloses the method of using an ophthalmic system for performing an examination on a subject eye, in which the ophthalmic system includes the plurality of examination units configured to be transported by being mounted on a vehicle, having different housings, performing different examinations, and having at least the first examination unit and the second examination unit, the robot mechanism having the holding unit that holds and releases either the first examination unit or the second examination unit, and the moving unit that is connected to the holding unit and moves three-dimensionally, and controller for controlling driving of the robot mechanism, the method includes the adjustment step of adjusting the relative positional relationship between the subject eye and the first examination unit and the second examination unit held by the holding unit, and a replacement step of replacing the first examination unit and the second examination unit held by the holding unit.

What is claimed is:

1. An ophthalmic system for examining a subject eye of an examinee, comprising:
   a plurality of examination units having housings different from each other, performing examinations different from each other, and including at least a first examination unit and a second examination unit;
   a robot mechanism having a holding unit that holds and releases either the first examination unit or the second examination unit, and a moving unit that is connected to the holding unit and moves three-dimensionally; and
   a controller configured to control driving of the robot mechanism to adjust a relative positional relationship between the subject eye and the first examination unit or the second examination unit held by the holding unit,
   wherein the first examination unit or the second examination unit is replaced to be held by the holding unit for performing a different examination on the subject eye.

2. The ophthalmic system according to claim 1,
   wherein the controller is configured to:
   set alignment positions of the plurality of examination units with respect to the subject eye, the alignment positions corresponding to the first examination unit and the second examination unit; and
   control a movement of the moving unit to adjust a position of the first examination unit or the second examination unit to the set alignment position.

3. The ophthalmic system according to claim 1,
   wherein the robot mechanism has a face detection unit that detects a face of the examinee, and
   the controller is configured to control a movement of the moving unit based on a detection result of the face detection unit to adjust a position of the first examination unit or the second examination unit.

4. The ophthalmic system according to claim 1,
   wherein the controller is configured to control the driving of the robot mechanism to cause the holding unit to hold or release either the first examination unit or the second examination unit, and
   the first examination unit or the second examination unit is replaced to be held by the holding unit for performing the different examination on the subject eye.

5. The ophthalmic system according to claim 4,
   wherein the controller is configured to control a movement of the moving unit to bring the holding unit closer to a storage position of the first examination unit or the second examination unit, and to cause the holding unit to selectively hold either the first examination unit or the second examination unit.

6. The ophthalmic system according to claim 4,
   wherein the first examination unit and the second examination unit have identifiers for identifying each other on the housing,
   the ophthalmic system further comprises an identifier detection unit that detects the identifier, and the controller is configured to select and replace the first examination unit or the second examination unit held by the holding unit, based on a detection result of the identifier detection unit.

7. The ophthalmic system according to claim 1,
wherein the robot mechanism has an arm, as the moving unit, which includes a plurality of joints, and
the controller is configured to control a movement of the arm via the plurality of joints to adjust a position of the first examination unit or the second examination unit.

8. The ophthalmic system according to claim 7,
wherein the robot mechanism includes at least one rotation axis in the plurality of joints, and
the controller is configured to control a rotation of the rotation axis to adjust at least one angle of a roll angle, a pitch angle, and a yaw angle of the first examination unit or the second examination unit.

9. An ophthalmic system for examining on a subject eye or performing surgery on the subject eye, comprising:
a plurality of units having housings different from each other, performing examinations or surgeries different from each other, and including at least a first unit and a second unit;
a robot mechanism having a holding unit that holds and releases either the first unit or the second unit, and a moving unit that is connected to the holding unit and moves three-dimensionally; and
a controller configured to control driving of the robot mechanism to adjust a relative positional relationship between the subject eye and the first unit or the second unit held by the holding unit,
wherein the first unit or the second unit is replaced to be held by the holding unit for performing a different examination or different surgery on the subject eye.

* * * * *